US012762740B1

(12) United States Patent
Khanna et al.

(10) Patent No.: US 12,762,740 B1
(45) Date of Patent: *Oct. 13, 2026

(54) CONTINUOUS CAMERA CALIBRATION AND AUTOMATED CORRECTION FOR ROBOTIC SYSTEMS

(71) Applicant: Amazon Technologies, Inc., Seattle, WA (US)

(72) Inventors: Sanjeev Khanna, Boston, MA (US); Bradley Penrow, Tewksbury, MA (US)

(73) Assignee: Amazon Technologies, Inc., Seattle, WA (US)

( * ) Notice: Subject to any disclaimer, the term of this patent is extended or adjusted under 35 U.S.C. 154(b) by 499 days.

This patent is subject to a terminal disclaimer.

(21) Appl. No.: 18/466,137

(22) Filed: Sep. 13, 2023

(51) Int. Cl.

| | |
|---|---|
| ***G06T 7/80*** | (2017.01) |
| ***B25J 9/16*** | (2006.01) |
| ***H04N 23/90*** | (2023.01) |

(52) U.S. Cl.
CPC ............... *G06T 7/80* (2017.01); *B25J 9/1692* (2013.01); *B25J 9/1697* (2013.01); *H04N 23/90* (2023.01); *G06T 2207/10024* (2013.01); *G06T 2207/30204* (2013.01); *G06T 2207/30244* (2013.01)

(58) Field of Classification Search
CPC ............. G06T 7/80; G06T 2207/10024; G06T 2207/30204; G06T 2207/30244; H04N 23/90
See application file for complete search history.

(56) References Cited

U.S. PATENT DOCUMENTS

| | | | | |
|---|---|---|---|---|
| 2019/0052862 A1* | 2/2019 | Zhao | .................... | H04N 13/239 |
| 2020/0198145 A1* | 6/2020 | Hsu | ........................ | B25J 9/1697 |
| 2020/0262080 A1* | 8/2020 | Ghobadi | ................ | B25J 9/1697 |
| 2021/0254968 A1* | 8/2021 | Zhang | .................. | G01B 11/002 |
| 2021/0291376 A1* | 9/2021 | Wang | ........................ | G06T 7/85 |
| 2022/0147026 A1* | 5/2022 | Poelman | ................ | B25J 9/1692 |
| 2022/0365190 A1* | 11/2022 | Nathan | ................. | G01S 7/4817 |

FOREIGN PATENT DOCUMENTS

| | | | | |
|---|---|---|---|---|
| JP | 6816454 B2 * | 1/2021 | | |
| WO | WO-2020121396 A1 * | 6/2020 | ................ | B25J 9/10 |

OTHER PUBLICATIONS

U.S. Pat. No. 11,912,513 B1 Claims (Year: 2024).*

* cited by examiner

*Primary Examiner* — Nhi Q Bui
(74) *Attorney, Agent, or Firm* — Eversheds Sutherland (US) LLP

(57) ABSTRACT

Systems, methods, and computer-readable media are disclosed for continuous camera calibration and automated correction for robotic systems. In one embodiment, an example robotic system may include a robotic manipulator and a picking assembly coupled to the robotic manipulator, where the picking assembly is configured to grasp and release items. The robotic system may include a first camera having a first field of view, a first calibration pattern disposed at a first location within the first field of view, and a controller configured to automatically calibrate the robotic system.

17 Claims, 9 Drawing Sheets

CONTINUOUS CAMERA CALIBRATION AND AUTOMATED CORRECTION FOR ROBOTIC SYSTEMS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that manual efforts can be redirected to different tasks.

Figure 1:
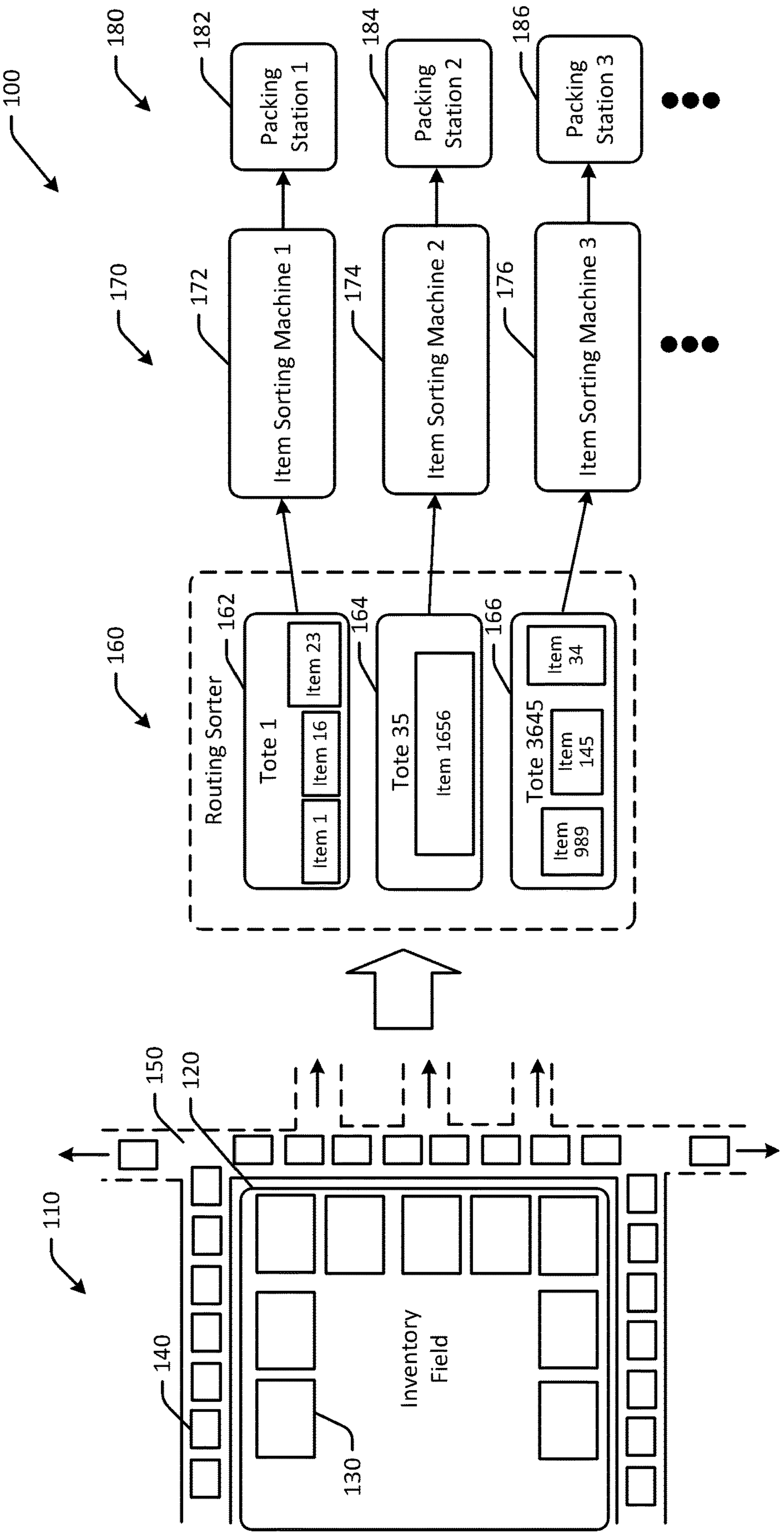
FIG. 1 is a hybrid schematic illustration of an example use case for continuous camera calibration and automated correction for robotic systems and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. In addition, retrieving a certain number of items, such as singular items, may be difficult depending on a type of packaging in which the item comes with. Further, once all of the items in an order are aggregated (for single item or multi-item orders), the items may be placed into boxes for shipping. The boxes may then be loaded onto trucks or other forms of transport. Humans may be able to manually handle individual items, including packages, with ease. However, robotic handling of individual items may require various levels of dexterity. In addition, using a robot or other machine to grasp an item in a cluttered environment, such as a box or tote with multiple items inside, may be difficult to achieve reliably using mechanical systems.

To accurately grasp items from a first container, move the item to a second container, and then release the item using a robotic manipulator, such as a robotic arm, robotic precision of a number of millimeters may be needed. In some instances, positioning precision or accuracy of 5 millimeters or better may be needed for optimal performance, where the accuracy represents an actual robotic position compared to where the robot should actually be. For example, a target pick point on an item may have a radius of 2.5 millimeters, where the item is to be grasped using an end of arm tool, such as a picking assembly or other end of arm tool, coupled to a robotic arm. Accordingly, the robotic arm must position the picking assembly within the target pick point or region to optimally grasp and/or handle the item.

Such tight tolerances and high precision requirements may be difficult to satisfy due to continuous factors that may lead to uncalibration of the robotic manipulator. Factors that may negatively impact robotic calibration include vibration transmitted via a ground surface and/or other robots or machinery in the vicinity, changes in ambient light that impact camera performance (where cameras are used to determine pick points on items, track robotic movement, and/or other functions, etc.), vibration caused by factors external to a facility (e.g., heavy trucks moving at a loading dock, etc.), moving heavy items using robotic manipulators and/or picking assemblies (e.g., 40 pound bags of cat food, etc.), and other factors. These factors and others can lead to uncalibration of a robotic manipulator, which may then result in misplacement of end of arm tools, such as picking assemblies, which may then lead to suboptimal performance of the robotic system, such as increased items that are dropped by the picking assembly, items that are not grasped during a first attempt, items that are not released at the proper destination location, and so forth.

Moreover, in instances where a robotic manipulator does not merely repeat the same function or same set of functions, calibration can be even more critical. For example, in environments where the robotic system may be used to grasp and move items of drastically different sizes and weights in succession (e.g., first a quarter pound rectangular box of staples, then a 3 pound round basketball, and then a bag of cat food weighing 40 pounds, etc.), a likelihood that the robotic system becomes uncalibrated may increase. This is because the path of movement once the item is grasped can be different for each item, and the robotic system is not simply repeating the same motion or set of motions, but instead is planning a potentially infinite number of paths for the different items based on size, weight, shape, and so forth. Typical calibration processes for robotic systems can take upwards of 15 minutes and can therefore be costly as far as downtime of robotic equipment. Accordingly, calibration of robotic systems in a time saving manner, and potentially without requiring a dedicated calibration process, may be desired.

To calibrate robotic systems and/or camera systems used with robotic systems in particular, a calibration process may be used. Camera calibration may be a process of estimating the rigid geometrical relationship between optical axis of the camera lens to its pose sensor (e.g., intrinsics calibration, etc.), as well a geometrical relationship between the pose of the sensor to an external world (e.g., extrinsics calibration, etc.). Intrinsic calibration converts camera coordinates to pixel coordinates, while extrinsic calibration converts world coordinates to camera coordinates. The intrinsic calibration determines the optical properties of the camera lens, such as the focal point, principal point (e.g., optical offsets, etc.), and distortion parameters. Intrinsic calibration maps the camera coordinates to pixel coordinates (e.g., maps virtual objects in the real world). Intrinsic parameters may include one or more of the following: a scale factor (e.g., could be equal to 1, etc.), a focal length (e.g., distance between the center of projection an the image plane, etc.), a principal point (e.g., assume pixel 0,0 to be at the center of the image, etc.), a skew value (e.g., when the principal point is not exactly at the center of the image plane), a geometric distortion value (e.g., due to the lens, etc.), and so forth. The extrinsic calibration determines the pose of the camera with respect to some world coordinate frame. Extrinsic calibration describes the position of the camera in the world. The calibration component enables sensor data registration across different two dimensional sensors, such as image data, and three dimensional sensors, such as point cloud data. This may allow for data interoperability in a robotic work cell. Robotic manipulation relies on camera calibration for accuracy and reliability.

Scene correction is a process to make image data captured by camera systems aesthetically pleasing and can involve adjusting various camera settings, such as white balance and color correction settings—e.g., adjusting color temperature, adjusting color hue/saturation values, etc. White balance impacts the scene temperature by making white appear white and black appear black (and desired levels of gray in between). Color correction is the process of adding color fidelity in an image with respect to the real world. It can be separated into three facets: brightness (the overall level of light in an image), contrast (the relative light levels of adjacent areas in and image), and color balancing (adjusting the overall hue/dominant wavelength of an image). Brightness and contrast together can be considered tonal adjustments. Modifications can be performed via a color transformation matrix, via color-by-color level hue-saturation control (e.g., 3 channel, 6 channel, etc.), and so forth. Overall, calibration may result in balancing of color tones (e.g., color shades) and accurate representation of the tonal variation in the image. Scene correction keeps the image quality and point cloud quality consistent across work cells or robotic operational environments regardless of background lighting and environment. As a result, perception model performance consistency is improved and deterministic/predictable outputs are increased.

Continuous monitoring component proactively validates the scene, informs the system whenever it is deviating outside the defined operating bounds, and performs self-correction. It makes the work cell robust to physical changes (e.g. camera displacements over time) and environment changes (e.g. changes in background lighting, foreground lighting) that would normally go undetected and degrade performance. Continuous monitoring, as described herein, results in improved performance from perception systems, manipulation systems, and keeps item pick/place related issues to a minimum.

Embodiments of the disclosure include methods and systems for continuous camera calibration and automated correction for robotic systems that may improve processing and fulfillment of orders, or other object aggregation tasks. In order to perform continuous scene monitoring and self-sensor correction, embodiments implement a combination of fiducials and/or calibration patterns placed in the robotic work cell within various camera fields of view. In addition, automated algorithms are executed continuously to output various metrics. Whenever the metrics exceed predefined thresholds, the system automatically pauses, performs self-correction, validates itself and resumes its operations. If the system is unable to self-correct itself, alarms are raised for manual intervention. Certain embodiments include robotic manipulators with picking assemblies that use calibration plates or patterns disposed in a robotic operating environment for robotic system camera calibration. Although described in example herein of a calibration "plate," calibration patterns may be in different forms, such as three-dimensional markers coupled directly on an end of arm tool housing, painted markers or other forms of two-dimensional markers applied in a work cell or robotic ambient environment, thin sheets of material adhered to robotic environment, and so forth. Some embodiments may be disposed on end of arm tool housings without requiring flat surfaces on which to mount the calibration pattern.

Some embodiments may be configured to complete a dedicated calibration process in less than 5 minutes, and other embodiments may be configured to complete a calibration process while the robotic system remains in use (e.g., with no downtime, etc.). Embodiments may include end of arm tools, such as picking assemblies, in conjunction with vacuum suction to pick up and/or release, or otherwise handle, objects, so as to increase throughput and speed of object handling. Some embodiments include optimized process flows for processing of orders at fulfillment centers, as well as process flows or methods to increase speed of consolidating products in a multi-item order as a result of improved speed in placing items into containers and removing items from containers. As a result, throughput of fulfillment centers may be improved, and/or logistics of fulfillment center operations may be less complicated.

Referring to FIG. 1, an example use case 100 for continuous camera calibration and automated correction for robotic systems and an example process flow in accordance with one or more embodiments of the disclosure. Although discussed in the context of online orders, other embodiments may be directed to any suitable use case where objects are picked and released, such as instances where objects are picked from inventory, placed into containers, removed from containers for sorting, and so forth.

In FIG. 1, a fulfillment center may include an inventory field 110, a routing sorter 160, one or more item sorting machines 170, and one or more packing stations 180. The inventory field 110 may be include a storage platform, or a portion of the fulfillment center at which products picked from product inventory are placed. Robots may be used to pick products from inventory and to deliver to the robotic storage platform in some instances, while in other instances, manual labor or a combination thereof may be used to pick products. For example, robotic systems may be used to pick objects from inventory containers and to place the retrieved objects into containers. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote ("tote" as used herein can be any suitable container). Robots at the picking process, or elsewhere within the facility, such as item sortation, item aggregation, item routing, and so forth may be used in conjunction with the continuous camera calibration and automated correction for robotic systems described herein.

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include robotic components, or a combination thereof. In some instances, picking of items from the inventory field 110 may be completed by robots that implement continuous camera calibration and automated correction for robotic systems, where the items are delivered to the picking stations 130 after being retrieved from the inventory field 110. Any number of picking stations 130 may be included, and the picking stations 130 may be located in a different position than that illustrated in FIG. 1.

One or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configuration may be used. In the illustrated example, the conveyors 150 may include belts or rollers that run alongside the picking stations 130 and include one or more paths to one or more routing sorters.

The conveyors 150 may be used to transport one or more totes 140. For example, as totes 140 move along the conveyors 150, items may be moved from the picking stations 130 into respective totes 140. The totes 140 may be associated with particular item sorting machines, and may be moved using the conveyors 150 to a routing sorter 160.

In some embodiments, contents of totes may be consolidated in a tote consolidation process. For example, items from different totes destined for the same destination in a facility may be aggregated into a single tote. To consolidate the items, items from one or more totes may be removed and placed into another tote. Certain robotic manipulation systems may be configured to perform the tote consolidation process, or to otherwise consolidate items, using a robotic manipulation system. Calibration of the system may be performed as described herein.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Some or all of the item sorting machines may be associated with one or more packing stations 180 that may be used to pack items into a shipment when a multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time.

At any of the stages of the example fulfillment process of FIG. 1 where handling of objects is used, such as to pick items from inventory, place items in totes, remove items from totes, place items into bins, remove items from bins, place items into boxes for shipping, and so forth, continuous camera calibration and automated correction for robotic systems as described herein may be used. As a result, manual effort can be redirected to other tasks, and time savings may be achieved, along with improved robotic performance due to increased calibration.

Example embodiments of the disclosure provide a number of technical features or technical effects. For example, in accordance with example embodiments of the disclosure, certain embodiments of the disclosure may include continuous camera calibration and automated correction for robotic systems. Certain embodiments may improve processing speed, throughput, and/or efficiency of fulfillment centers. Certain embodiments may improve performance of mechanical equipment for sortation and/or consolidation of items. While described in the context of online orders, aspects of this disclosure are more broadly applicable to other forms of object handling. While described in the context of online orders, aspects of this disclosure are more broadly applicable to other forms of object handling. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

ILLUSTRATIVE EMBODIMENTS AND USE CASES

Figure 2:
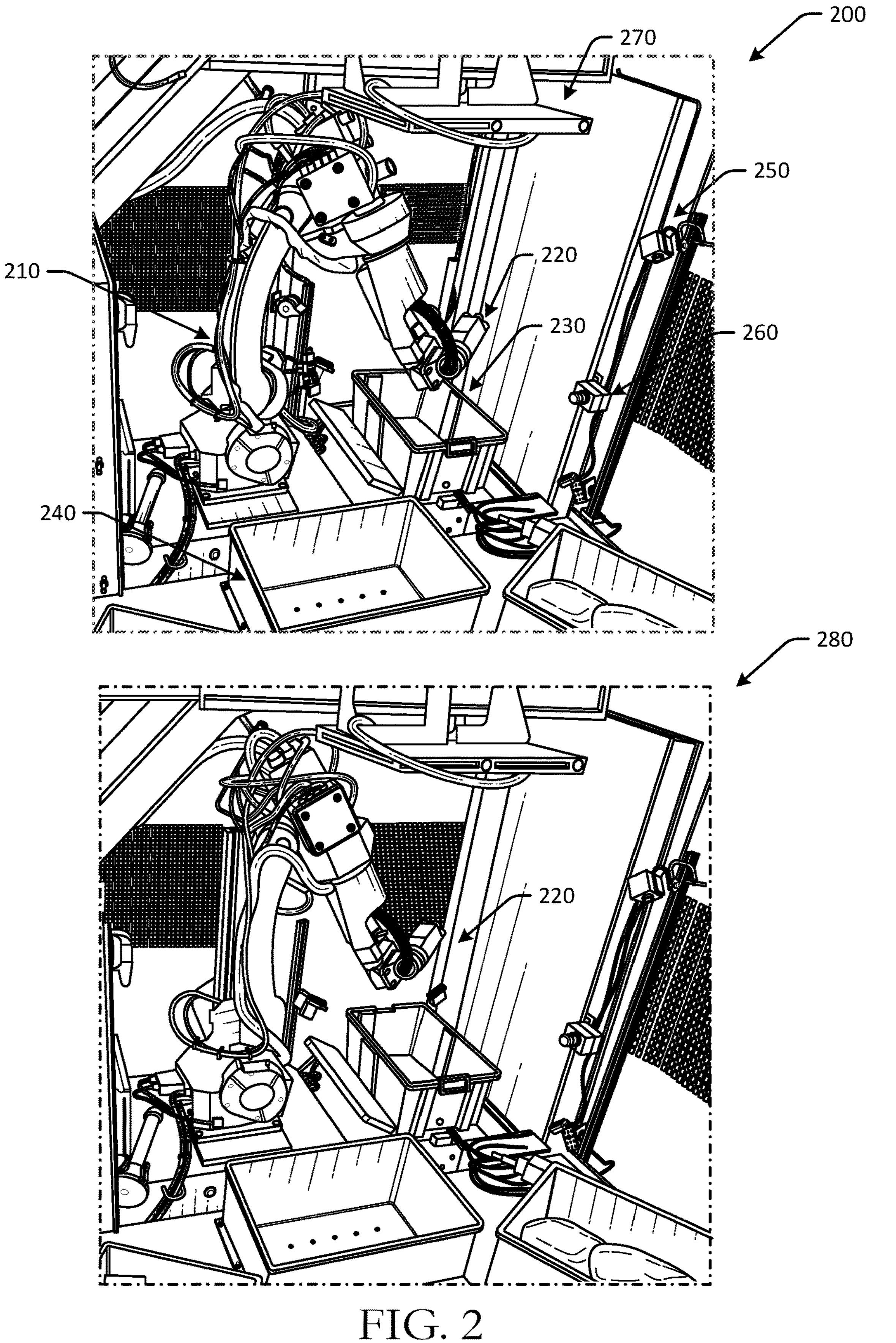
FIG. 2 is a schematic illustration of a robotic system performing camera calibration and automated correction in accordance with one or more embodiments of the disclosure.

FIG. 2 is a schematic illustration of a robotic system 200 performing camera calibration and automated correction in accordance with one or more embodiments of the disclosure. Other embodiments may include additional or fewer components. The illustration of FIG. 2 may not be to scale, and may not be illustrated to scale with respect to other figures. The robotic system illustrated in FIG. 2 may be the robotic system discussed with respect to FIG. 1.

The robotic system 200 may include a robotic manipulator 210, such as a robotic arm, a gantry, or other robotic manipulator, that is configured to grasp and move items. For example, the robotic system 200 may be configured to use the robotic manipulator 210 to move items from a first container 230 to a second container 240. To grasp items, the robotic manipulator 210 may be coupled to an end of arm tool, such as a picking assembly 220. The picking assembly 220 may be a suction-based picking assembly, where negative air pressure may be used to secure items to the picking assembly 220, and positive air pressure may optionally be used to release items from grasp. The robotic system 200 may include one or more cameras, such as a first camera 250, a second camera 260, a third camera 270, and so forth. Any number of cameras may be used. The cameras may be oriented at different angles, such as downwards towards the picking assembly 220, upwards towards the picking assembly 220, and/or other orientations. As depicted at a second point in time 280, the robotic manipulator 210 may move the picking assembly 220 from a first location to a second location so as to retrieve an item, transport an item, release an item, calibrate the robotic manipulator 210, and so forth.

Vision-based robotic solutions may rely on known transformations between the robotic manipulator and the cameras on station for calibration. This calibration is extrinsic, and allows for defining of the transformation between multiple cameras and objects, static and dynamic, within a system. Furthermore, different camera systems have a range of features that also require calibration, including lens intrinsic, focus validation, white balance, and color correction.

The robotic system 200 may include integrated position registered markers in the robotic environment, such as on picking assembly 220, where the markers may be in the form of one or more calibration plates. This reduces the potential error stack-up as other existing solutions, as a separate calibration plate does not have to be grasped and moved using the end of arm tool. Embodiments also allow for a wider range of camera placements.

The robotic system 200 may therefore be a robotic system that includes a vacuum suction system configured to provide negative air pressure, the robotic manipulator 220, such as a robotic arm, the picking assembly 220 coupled to the vacuum suction system and the robotic manipulator 220, and the picking assembly 220 configured to grasp and release objects. The picking assembly 220 may optionally include a shell having a hexagonal cross-sectional geometry, such that six flat faces are formed on an external surface of the shell. The robotic system 200 may include a first calibration plate rigidly mounted to a first surface in the ambient environment, which may be anywhere within a camera field of view of a camera in the work cell (e.g., some work cells may have more than ten cameras, etc.). The first calibration plate may have a first pattern disposed thereon, where the first calibration plate is optionally non-reflective (e.g., formed of a non-reflective material and/or having a non-reflective coating, etc.). The robotic system 200 may include a second calibration plate rigidly mounted to a second surface and/or in a second location, the second calibration plate having a second pattern disposed thereon, where the second calibration plate is non-reflective as well. Any number of calibration plates can be included. Calibration plates and patterns are discussed in more detail with respect to FIGS. 5A-5B. The robotic system 200 may include the first camera 250 oriented towards the robotic arm and/or picking assembly 220 at a downwards angle relative to horizontal, and the second camera 260 oriented towards the robotic arm and/or picking assembly 220 at an upwards angle relative to horizontal. The robotic system 200 may include a controller configured to calibrate positioning of the picking assembly.

Although a single picking assembly is illustrated in FIG. 2, in some embodiments, more than one picking assembly may be used in conjunction with each other to pick up objects. For example, some embodiments may include multiple picking assemblies arranged in an array or in a vertically offset arrangement to pick up objects. For example, the picking assembly illustrated in FIG. 2 may be a first picking assembly, and the robotic picking assembly may also include a second picking assembly disposed adjacent to the first picking assembly, and a third picking assembly disposed adjacent to the first picking assembly. The second picking assembly and/or the third picking assembly are in an offset vertical position with respect to the first picking assembly. Such an arrangement may improve the ability of the device to pick up objects with non-uniform surface features. In another example, the picking assembly illustrated in FIG. 2 may be a first picking assembly, and the robotic picking assembly may include a second picking assembly disposed adjacent to the first picking assembly, and a third picking assembly disposed adjacent to the first picking assembly. The second picking assembly and/or the third picking assembly may be arranged around the first picking assembly in a concentric arrangement, a circular arrangement, an elliptical arrangement, an oval arrangement, a rectangular arrangement, and the like.

Figure 3:
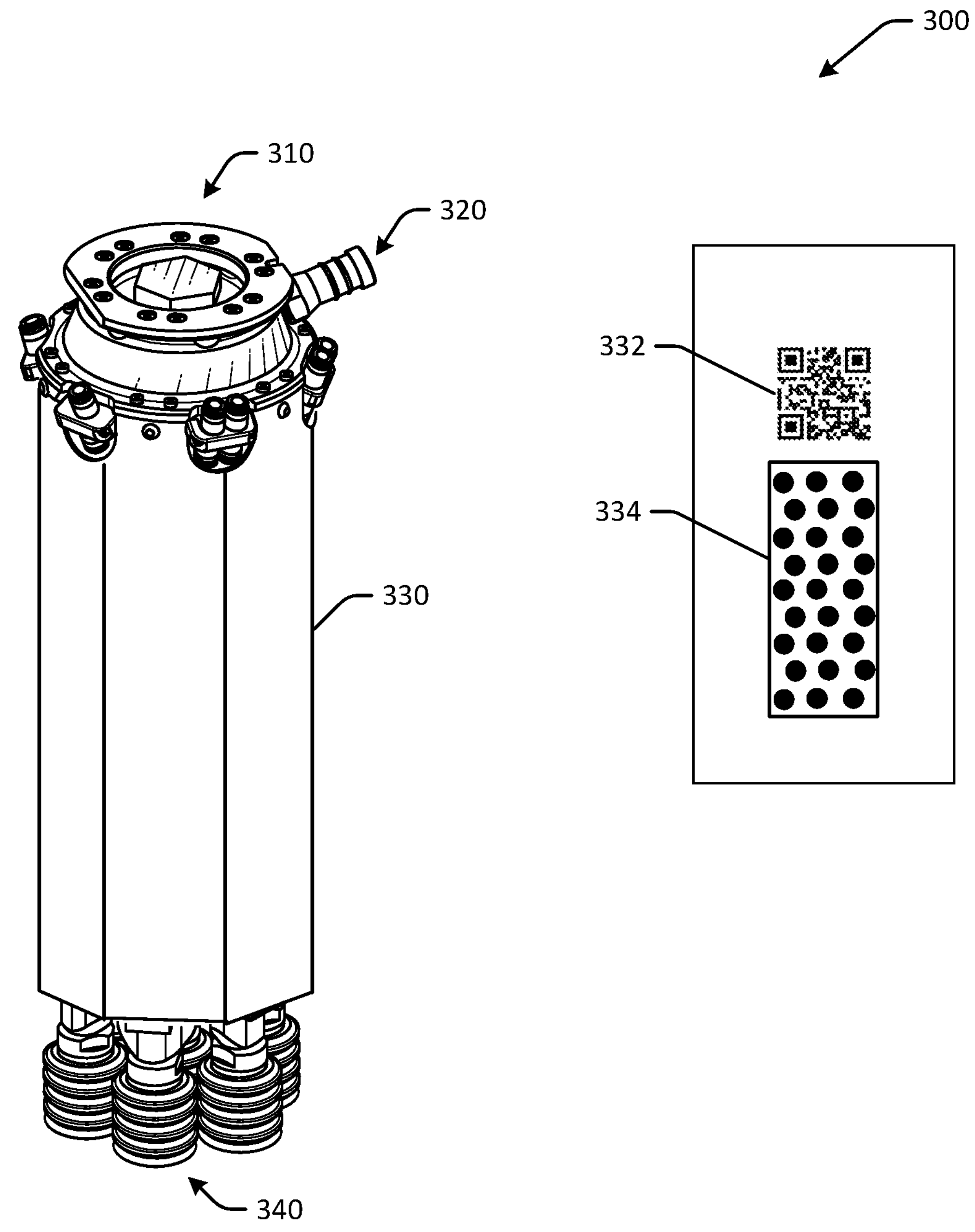
FIG. 3 is a schematic illustration of an example picking assembly and one or more calibration patterns mounted in an environment in accordance with one or more embodiments of the disclosure.

FIG. 3 is a schematic illustration of an example picking assembly 300 and one or more calibration patterns mounted in an environment in accordance with one or more embodiments of the disclosure. Other embodiments may include additional or fewer components. The illustration of FIG. 3 is not to scale, and may not be illustrated to scale with respect to other figures. The picking assembly illustrated in FIG. 3 may be the same end of arm tool discussed with respect to FIGS. 1-2.

In FIG. 3, the picking assembly 300 may be an end of arm tool that is coupled to a robotic manipulator. The picking assembly 300 may be a suction-based tool that is used to grasp, move, and release items. The picking assembly 300 may be moved into position via a robotic manipulator. In a first perspective view 310, the picking assembly 300 is depicted with a shell or housing 330. As illustrated, the picking assembly 300 may include a number of individual piston subassemblies that may be arranged or otherwise disposed in a parallel arrangement. FIG. 3 depicts the parallel pistons in a retracted position.

One or more components may be coupled to a surface adjacent to the housing 330, such as on a wall or surrounding environment of a robotic work cell or robotic operational environment. For example, in FIG. 3, a machine readable code 332, which may be a color correction pattern (e.g., which may include a white balance marker or pattern, neutral balance pattern, gray balance pattern, etc.) or other machine readable pattern, may be disposed at a first location in the environment where it is within the field of view of one or more cameras, such that the camera(s) can use the pattern to determine whether automated calibration is needed. Other components, such as calibration plates, stickers, sheets, or other forms of calibration patterns may be disposed in the environment. The machine readable code 332 may be used to calibrate the robotic system by adjusting color balance settings or values of one or more cameras. For example, a controller associated with a robotic system may be configured to determine an image of the color correction pattern using a first camera, and may adjust a color balance of the first camera based at least in part on the first image.

For example, one or more calibration plates 334 may be disposed at a second location in the environment. The calibration plate 334 may have a registered pattern, such as a number of circles of a particular size and/or arranged in a particular pattern. The pattern on the calibration plate 334 may be used in conjunction with one or more cameras to calibrate a robotic manipulator to which the picking assembly 300 is coupled. For example, images of the pattern on the calibration plate 334 may be captured and used, along with position information of the robotic manipulator (e.g., three-dimensional coordinates corresponding to a pose of the robotic manipulator at a time at which the image was captured, etc.), to calibrate the robotic manipulator.

The picking assembly 300 may be a picking assembly that includes the housing 330. The housing 330 may be formed of carbon fiber, plastic, aluminum, a composite material, or a different type of high strength low weight material. The housing 330 may be a load bearing component, which may reduce stress on the piston subassemblies, and may improve a lifetime of the picking assembly 300. The picking assembly may include any number of suction cups 340. The suction cups 340 may be disposed adjacent to a lower end of the housing 330 in a retracted position. In other embodiments, the suction cup 340 may be disposed inside the housing 330 in the retracted position. The suction cups 340 may be compliant components that may be used to grasp objects of different shapes, sizes, and materials. Each individual suction cup 340 may have its own compliance to assist with item deformation. The picking assembly 300 may be lightweight to improve repeatability. For example, the picking assembly 300 may have a total weight of less than about 5 pounds, and individual piston subassemblies may have a weight of about 100 grams. In addition, the lifting capacity of the system is improved, as a reduced weight increases the amount of mass the robot can lift (e.g., the total lift capacity may be unchanged, but a heavier item can be lifted due to a reduced weight of the picking assembly, etc.) The housing 330 may improve rigidity of the picking assembly and may resist shearing or twisting of the piston subassemblies.

Although illustrated as a single piston subassembly disposed in a center surrounded by six piston subassemblies disposed in a circular arrangement about the center piston subassembly, any number of piston subassemblies may be used, and any number of circular formations may be used. Other configurations, such as arrays, rectangles, random patterns, and other configurations of piston subassemblies may be included.

The picking assembly 300 may be coupled to a robotic arm or other device configured to move the picking assembly from a first location to a second location. The picking assembly 300 may be coupled to a vacuum suction system that is configured to generate negative pressure to pick up an item, and positive pressure to release the item. For example, the picking assembly 300 may be part of a robotic system that includes a robotic manipulator. The picking assembly 300 may be coupled to the robotic manipulator, and the picking assembly 300 may be configured to grasp and release items using suction. The system may include a first camera having a first field of view, a first calibration pattern disposed at a first location within the first field of view, and a controller configured to automatically calibrate the robotic system. For example, the first calibration plate may be adhered, bolted, or otherwise secured to a first location of the robotic operational environment. The first calibration plate may have a first pattern. The robotic system may include one or more cameras, such as a first camera, configured to image the first calibration plate, and a controller configured to calibrate the robotic manipulator.

The first camera may be part may optionally be oriented downwards towards the picking assembly, and a second camera may be oriented upwards towards the picking assembly. The robotic system may include a third camera and a fourth camera oriented downwards towards the picking assembly, and a fifth camera and a sixth camera oriented upwards towards the picking assembly. Any number of cameras may be included. The controller may be configured to calibrate the robotic manipulator using images captured by one or more of the cameras, such as the first camera, the second camera, the third camera, the fourth camera, the fifth camera, and the sixth camera.

Figure 4:
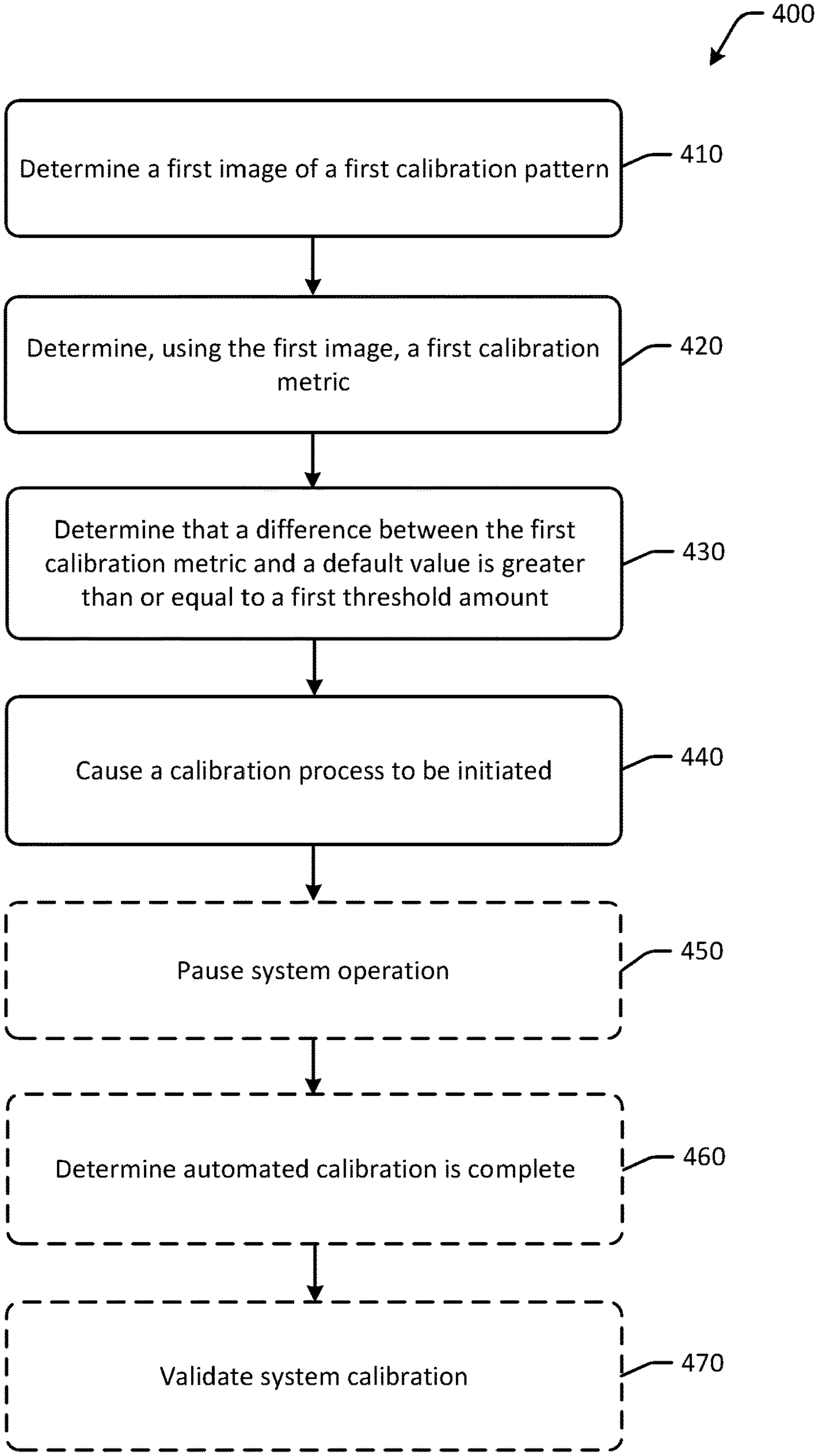
FIG. 4 is a schematic illustration of an example process flow for continuous camera calibration and automated correction for robotic systems in accordance with one or more example embodiments of the disclosure.

FIG. 4 depicts an example process flow 400 for continuous camera calibration and automated correction for robotic systems in accordance with one or more example embodiments of the disclosure. While example embodiments of the disclosure may be described in the context of robotic arm calibration, it should be appreciated that the disclosure is more broadly applicable to any type of robotic manipulator. Some or all of the blocks of the process flows in this disclosure may be performed in a distributed manner across any number of devices. The operations of the process flow 400 may be optional and may be performed in a different order.

In one example embodiment, the process flow 400 may be executed to determine calibration adjustments for a robotic arm and/or other components of a robotic system, such as camera calibration. Calibration adjustments account for differences between where the robotic arm is supposed to be positioned, and where the robotic arm is actually positioned. Calibration adjustments for cameras may include color correction and other features. Some embodiments may use images of one or more calibration plates rigidly mounted on an end of arm tool coupled to the robotic arm in order to determine calibration adjustments. Some embodiments may capture images during a dedicated calibration session (e.g., when the robotic arm is taken offline for normal tasks, etc.), whereas other embodiments may capture images during actual usage of the robotic arm, for on-the-move calibration without a dedicated calibration process. The process flow 400 may be used to calibrate the robotic manipulator and/or positioning of a picking assembly coupled to the robotic manipulator.

At block 410 of the process flow 400, computer-executable instructions stored on a memory of a device, such as a remote server or a user device, may be executed to determine a first image of a first calibration pattern. For example, a control module executed at a controller or computer system associated with a robotic system may determine, using a first camera, a first image of the first calibration pattern. The first camera may be disposed in a robotic operational environment or work cell and may be positioned such that the first calibration pattern is in the field of view of the first camera. More than one camera may be included, and more than one calibration pattern and/or more than one instance of the same calibration pattern may be included. The first image may be captured while the robotic manipulator is in motion.

The robotic system may include one or more cameras that may be used to determine or identify items, determine a path of movement for the robotic manipulator, calibrate the robotic manipulator, and so forth. Any number of cameras may be included. The cameras may be configured to capture images of the robotic manipulator at various points in time. During a calibration process, the first camera may be used to capture a first image of the first calibration plate while the robotic manipulator is in motion. In some embodiments, more than one camera may capture an image of the calibration plate at the first predetermined position and orientation. Further, in some instances, multiple images of the calibration plate may be captured by the first camera when the robotic manipulator is in motion. In some embodiments, more than one calibration plate may be used, and different cameras may be used to capture images of the different calibration plates. For example, a pattern on a calibration plate may be configured to be imaged by a camera having a certain resolution, where different patterns are used for different resolution cameras.

At block 420 of the process flow 400, computer-executable instructions stored on a memory of a device, such as a remote server or a user device, may be executed to determine, using the first image, a first calibration metric. For example, a control module executed at a controller or computer system associated with a robotic system may determine, using the first image, a first calibration metric. The first image may be processed using scene correction and/or other processing and may be used to determine one or more calibration metrics. The one or more calibration metrics may include one or more of a focus validation metric, a distortion validation metric, a sharpness estimation metric, a white balance metric, and so forth.

At block 430 of the process flow 400, computer-executable instructions stored on a memory of a device, such as a remote server or a user device, may be executed to determine that a difference between the first calibration metric and a default value is greater than or equal to a first threshold amount. For example, a control module executed at a controller or computer system associated with a robotic system may determine that a difference between the first calibration metric and a default value is greater than or equal to a first threshold amount. Default values may be different for different calibration metrics. Threshold amounts may be different for different calibration metrics as well. For example, certain metrics, such as distortion validation metrics, may have tighter tolerances, and therefore reduced threshold amounts, relative to other metrics, such as sharpness estimation.

At block 440 of the process flow 400, computer-executable instructions stored on a memory of a device, such as a remote server or a user device, may be executed to cause a calibration process to be initiated. For example, a control module executed at a controller or computer system associated with a robotic system may cause a calibration process to be initiated. In some embodiments, the controller may determine a first calibration adjustment for the robotic system, such as for one or more of the cameras (e.g., camera settings, etc.), the robotic manipulator (e.g., positioning adjustments, etc.), and so forth. In one example, the controller may determine first position data for the robotic manipulator. The controller may determine a first calibration adjustment based at least in part on the first position data and the first image. For example, the known position of the first camera, the position data, and the first image (and/or corresponding processing of the first image, etc.) may be used to determine whether there is a distance between the first position data and the position of the first predetermined position, and if so, whether the distance is to be offset with a calibration adjustment. For example, some embodiments may implement calibration adjustments after a threshold difference in expected position and actual position is exceeded, such as 1 millimeter. Other embodiments may implement calibration adjustments if a difference is detected. The first calibration adjustment may be a change in any one of two- or three-axes of movement, and may be used to correct the positioning of the robotic manipulator and/or picking assembly such that actual position corresponds to expected position (e.g., the first predetermined position, etc.). The process may be completed for more than one predetermined position, such as at different positions in a two dimensional space or a three dimensional space. In some embodiments, calibration adjustments may be determined based on multiple data points, such as feedback from a number of cameras and corresponding pose data, where the final calibration adjustment is optimized across all of the available feedback.

Accordingly, the robotic system may include a controller that is configured to calibrate positioning of a robotic manipulator and/or the picking assembly using a number of waypoints. For example, the controller may cause the robotic arm to move to a second predetermined waypoint, determine second position data associated with a pose of the robotic arm at the second predetermined waypoint, and may determine, using a second camera, a second image of the second calibration plate when the robotic arm is at the second predetermined waypoint. The camera may determine a second calibration adjustment based at least in part on the second position data and the second image. In some embodiments, the controller may be configured to cause the robotic manipulator to move the picking assembly across an entire field of view of the first camera and/or other cameras of the robotic system.

At optional block 450 of the process flow 400, computer-executable instructions stored on a memory of a device, such as a remote server or a user device, may be executed to pause system operation. For example, a control module executed at a controller or computer system associated with a robotic system may be executed to pause system operation. System operation may be paused during automated self-calibration for the camera system and/or robotic manipulator.

At optional block 460 of the process flow 400, computer-executable instructions stored on a memory of a device, such as a remote server or a user device, may be executed to determine that automated calibration is complete. For example, a control module executed at a controller or computer system associated with a robotic system may be executed to determine that automated calibration is complete. Calibration may be determined to be complete after one or more particular calibration settings are adjusted. In some embodiments, calibration may be applied to out-of-tolerance settings, whereas in other embodiments, calibration for additional settings (e.g., near out of range, etc.) may be performed while a system is paused.

At optional block 470 of the process flow 400, computer-executable instructions stored on a memory of a device, such as a remote server or a user device, may be executed to validate system calibration. For example, a control module executed at a controller or computer system associated with a robotic system may be executed to validate system calibration. For example, the controller may collect additional image data and determine whether any parameters or metrics are out of tolerance. In one embodiment, the controller may determine a second image of the first calibration pattern, and may determine, using the second image, a second calibration metric. In some embodiments, the second calibration metric is a geometric validation metric or an optical validation metric. The second calibration metric may be different than the first calibration metric. The controller may determine that a difference between the first calibration metric and a default value is less than the first threshold amount. The second image is captured after the calibration process is complete for validation.

Figure 5A:
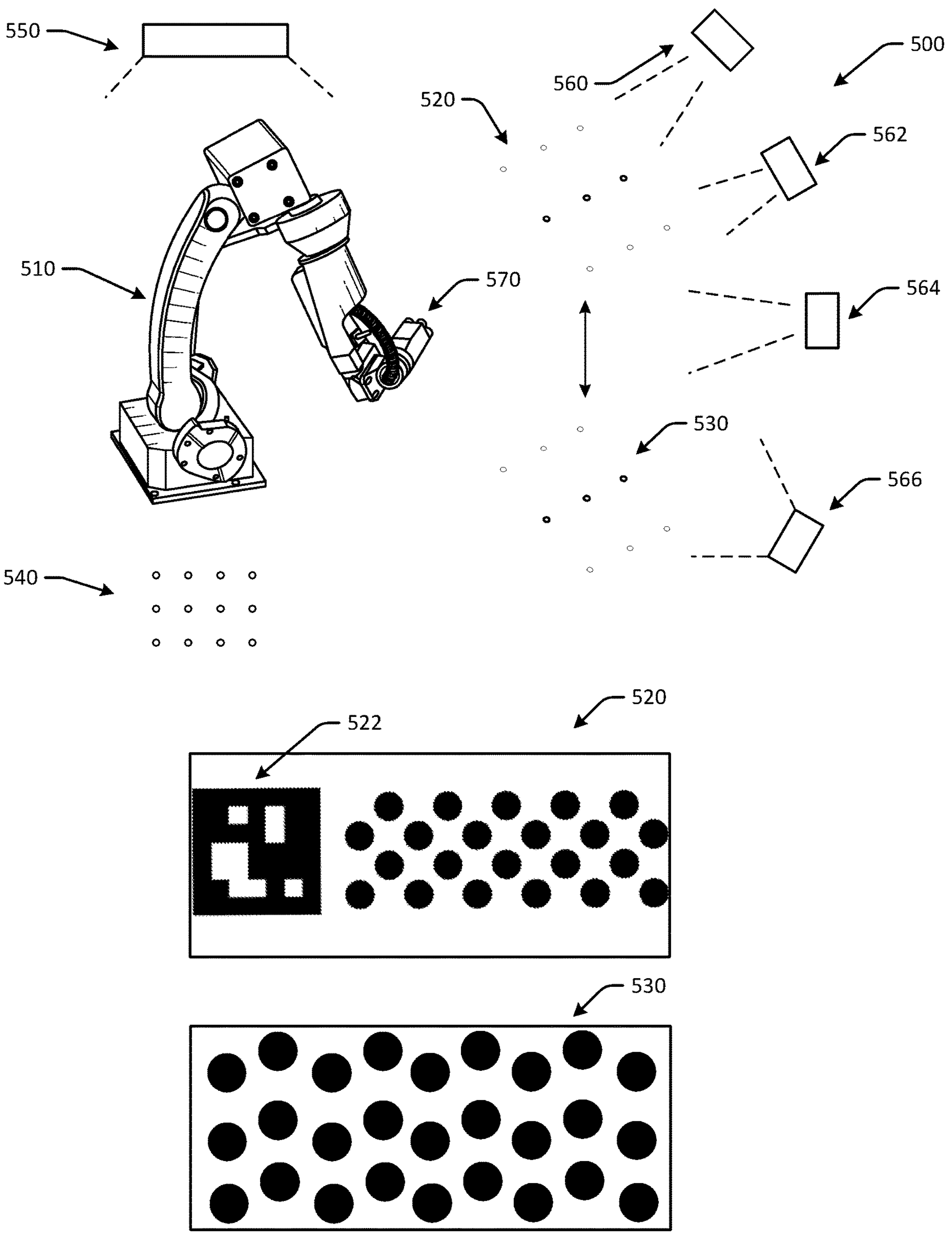
FIG. 5A is a schematic illustration of an example robotic system performing continuous camera calibration and automated correction, along with example calibration patterns, in accordance with one or more embodiments of the disclosure.

FIG. 5A is a schematic illustration of an example robotic system 500 performing continuous camera calibration and automated correction, along with example calibration patterns, in accordance with one or more embodiments of the disclosure. Other embodiments may include additional or fewer components. The illustration of FIG. 5A is not to scale, and may not be illustrated to scale with respect to other figures. The components illustrated in FIG. 5A may be components of the robotic systems discussed with respect to FIGS. 1-4.

In FIG. 5A, the robotic system 500 may include a robotic manipulator 510, such as a robotic arm. An end of arm tool, such as a picking assembly 570, may be coupled to the robotic manipulator 510. The robotic system 500 may operate in a partially enclosed space, such as a fenced off environment. A number of cameras may be positioned about the robotic manipulator 510. For example, a first camera 560 may be oriented downwards towards the picking assembly 570 of the robotic system 500, a second camera 562 may be oriented downwards towards the picking assembly 570, a third camera 564 may be oriented horizontally, a fourth camera 566 may be oriented upwards towards the picking assembly 570, a sixth camera 550 may be oriented downwards towards the picking assembly 570, and so forth. Any number of cameras may be used. Some embodiments may include arrays of cameras instead of standalone cameras.

One or more calibration plates or patterns 520, 530, 540 may be disposed in the environment. For example, as depicted in close-up views, a first calibration pattern 520 may be disposed at a first location, and a second calibration pattern 530 may be disposed at a second location in the environment. The first calibration pattern 520 may have a first pattern, and the second calibration pattern 530 may have a second pattern. In some embodiments, the first pattern and the second pattern may be the same pattern, whereas in other embodiments, the first pattern and the second pattern may be different, as depicted in the example of FIG. 5A. An example of a color correction pattern 522 is depicted as part of, or adjacent to, the first calibration pattern 520. Any number of calibration patterns and/or calibration markers may be used. The patterns may be registered patterns used for calibration when imaged by respective cameras. In embodiments where multiple patterns and/or calibration plates are used, the different patterns may be configured for imaging by cameras at different resolutions. For example, the first camera 560 may have a first resolution, and the second camera 562 may have a second resolution. The first pattern of the first calibration pattern 520 may be configured for imaging at the first resolution, and the second pattern of the second calibration pattern 530 may be configured for imaging at the second resolution.

During calibration, the robotic manipulator 510 may optionally move the picking assembly 570 to a number of predetermined positions in space. The predetermined positions may serve as waypoints. Once the robotic manipulator 510 is at a particular waypoint, position data associated with a pose of the robotic manipulator 510 (which represents an expected position of the robotic manipulator 510) may be compared to an actual position of the robotic manipulator 510 as determined based at least in part on images of one or more of the calibration plates coupled to the picking assembly, where the images are captured by one or more of the cameras. The predetermined positions may be at the same or different positions along a vertical axis.

Figure 5B:
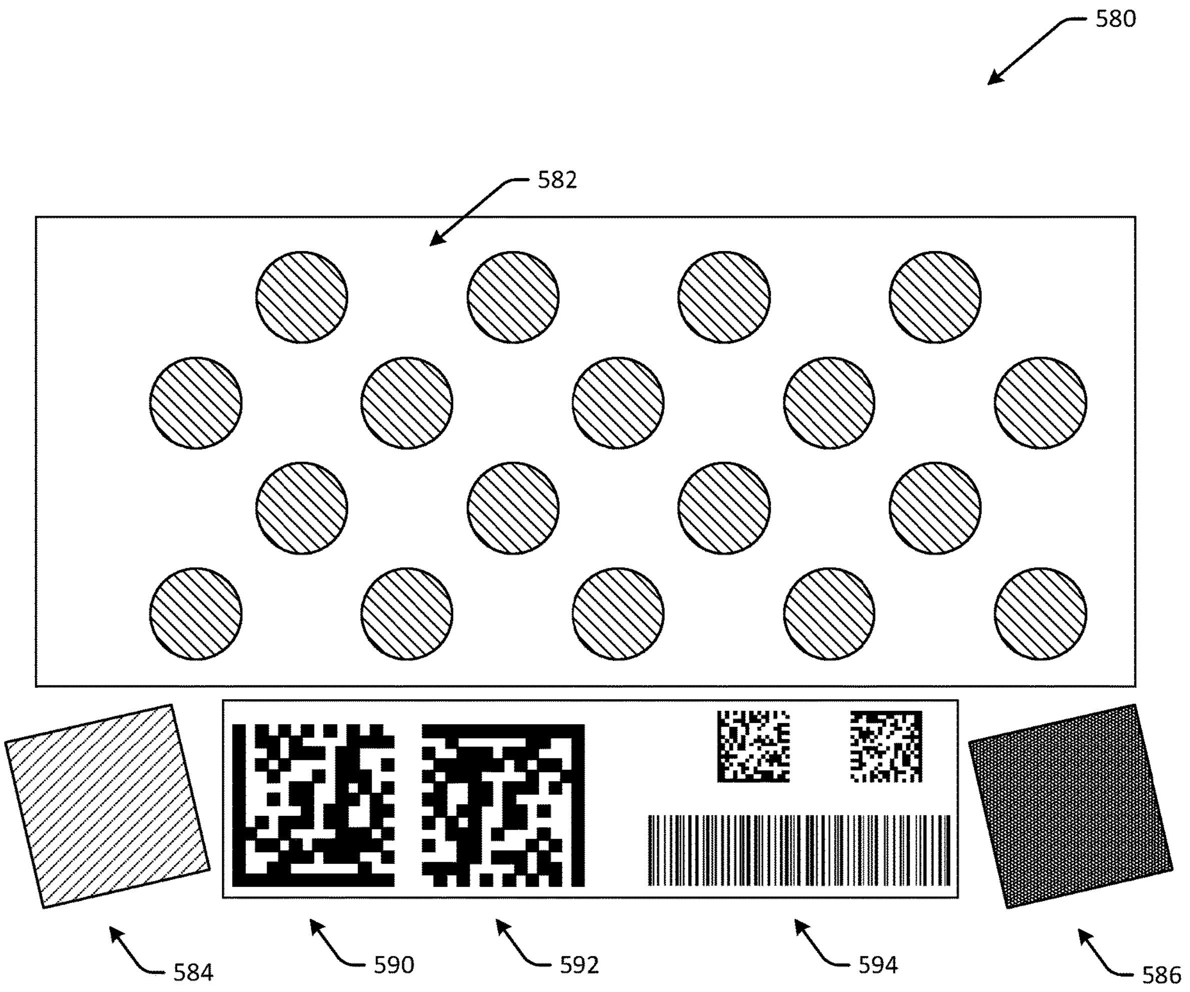
FIG. 5B is a schematic illustration of additional calibration patterns in accordance with one or more embodiments of the disclosure.

FIG. 5B is a schematic illustration of additional calibration patterns in accordance with one or more embodiments of the disclosure. The examples of FIG. 5B may be used instead of, or in conjunction with, any of the calibration patterns and/or color correction patterns discussed herein, such as those discussed with respect to FIGS. 1-5A.

In FIG. 5B, a first portion 582 of a calibration plate 580 may include intrinsic/extrinsic calibration components, intrinsic/extrinsic calibration validation components, and distortion correction components. Different fiducials may be used for calibration and scene correction. One or more of a gray geometric shape 584 and/or a black geometric shape 586 may be used for sharpness estimation, white balance settings, and distortion validation. One or more machine readable codes or fiducials 590, 592, 594 may be used for focus validation and distortion validation.

The patterns may include one or more different types of markers that form patterns recognized by cameras. The different markers may be in the form of machine readable codes, such as barcodes, QR codes, etc., or in different forms, such as those depicted in the example of FIG. 5B. Any suitable type of pattern may be used. As described herein, any number of patterns may be used to calibrate a robotic system, such as calibration of a robotic manipulator, calibration of one or more cameras, or other components of the robotic system.

Figure 6:
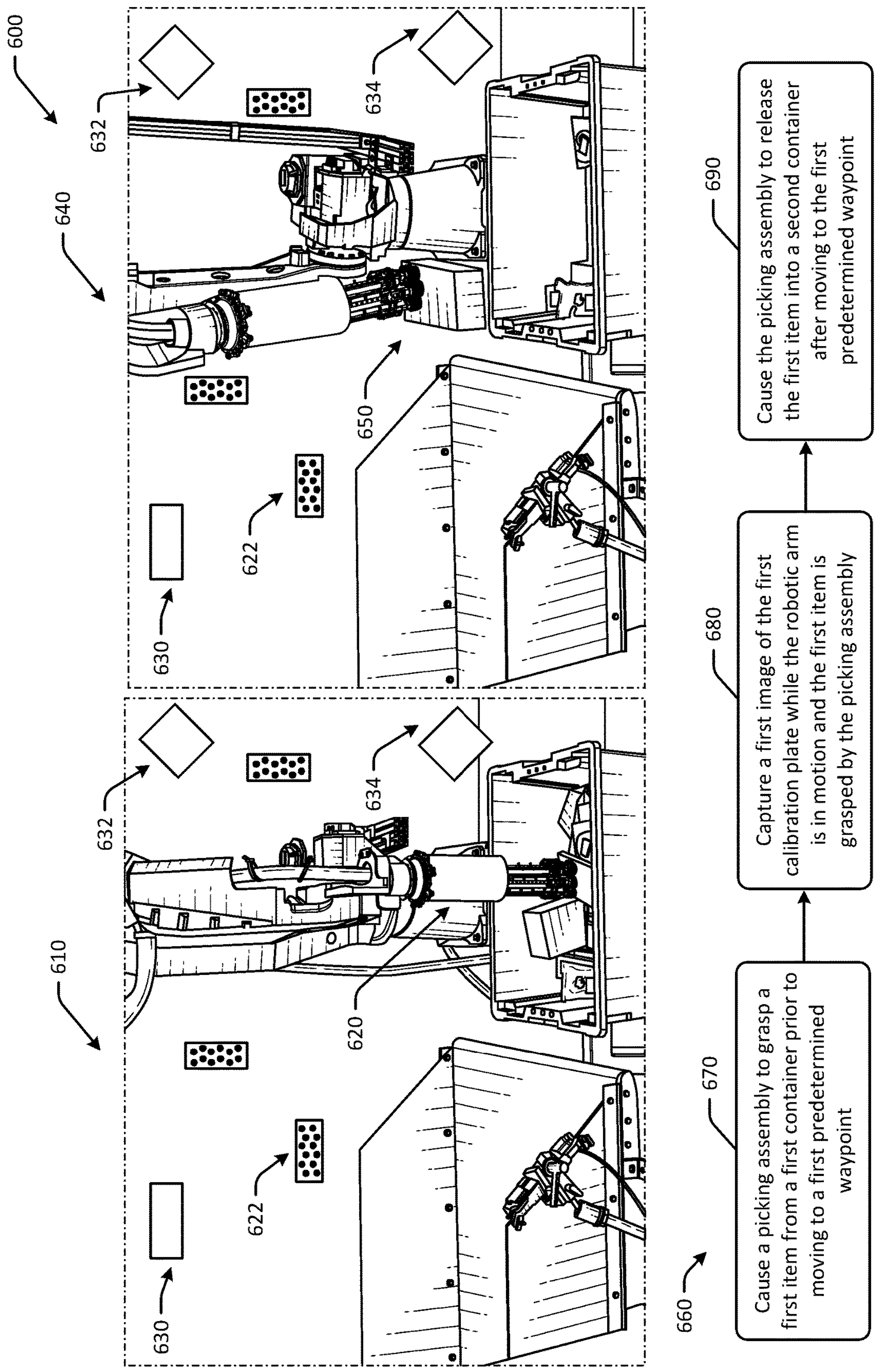
FIG. 6 is a schematic illustration of an example robotic system performing continuous camera calibration and automated correction while carrying an item in accordance with one or more embodiments of the disclosure.

FIG. 6 is a schematic illustration of an example robotic system 600 performing continuous camera calibration and automated correction while carrying an item in accordance with one or more embodiments of the disclosure. Other embodiments may include additional or fewer components. The illustration of FIG. 6 is not to scale, and may not be illustrated to scale with respect to other figures. The components illustrated in FIG. 6 may be components of the robotic system discussed with respect to FIGS. 1-5B.

In FIG. 6, a robotic picking assembly 620 may be used to pick up objects of various form factors and with different packaging materials (e.g., loose plastic bag packaging, boxes, etc.), as well as objects of different sizes and shapes, such as cylindrical objects, round objects, etc. To accurately and repeatedly grasp items in cluttered environments, embodiments may include picking tools with suction cups and parallel pistons. Individual pistons may be actuated depending on an amount of a target item (e.g., an item that is targeted for grasping, etc.) that is exposed, the shape and/or size of the target item, etc. The individual pistons may provide added flexibility in movement of the robotic arm or other device to which the picking assembly is coupled, such as a gantry or other device. Different shapes and configurations may be formed via the individual pistons that are actuated to an extended position. For example, a row of piston subassemblies and corresponding suction cups may be extended, an arc, semicircle, or circle of piston subassemblies and corresponding suction cups may be extended, individual piston subassemblies and corresponding suction cups may be extended, and so forth, based at least in part on imaging data indicative of a positioning and/or exposure of a target item (e.g., for instances where the target item is in a cluttered environment, etc.).

At a first instance 610, the robotic picking assembly 620 may be used to grasp an item from a number of items in a container. The robotic picking assembly 620 may be operated in an environment with a number of cameras, such as a first camera 632, a second camera 634, and a third camera 630. As depicted at a second instance 640, the robotic picking assembly 620 may grasp the item 650 and may move the item to another container.

While the robotic picking assembly 620 is in operation, some embodiments may be configured to calibrate one or more components of the robotic picking assembly 620, such as the robotic arm. For example, a calibration plate may be coupled to a housing of the robotic picking assembly 620. One or more of the cameras may image one or more calibration plates 622 as the robotic picking assembly 620 moves across a field of view of the respective camera.

The controller may therefore be configured to calibrate the robotic manipulator while the robotic manipulator is moving, and while the picking assembly is grasping an item. For example, the controller may execute a process flow 660 to calibrate the robotic picking assembly 620 during usage. At block 670, the controller may cause the picking assembly to grasp a first item from a first container prior to moving to the first predetermined waypoint. At block 680, the controller may cause a first image of the first calibration plate to be captured while the robotic arm is in motion and the first item is grasped by the picking assembly. At block 690, the controller may cause the picking assembly to release the first item into a second container after moving to the first predetermined waypoint. After a critical mass of images are captured by a particular camera of the calibration plate, such as images as the calibration plate moves across some or all of a width of a field of view of the camera, the controller may determine one or more calibration adjustments based on the image data, as well as position data representing positioning of the robotic picking assembly 620 and/or robotic arm at the time the image was captured. Accordingly, calibration can take place without a dedicated calibration cycle, and while the robotic picking assembly 620 is in usage.

Figure 7:
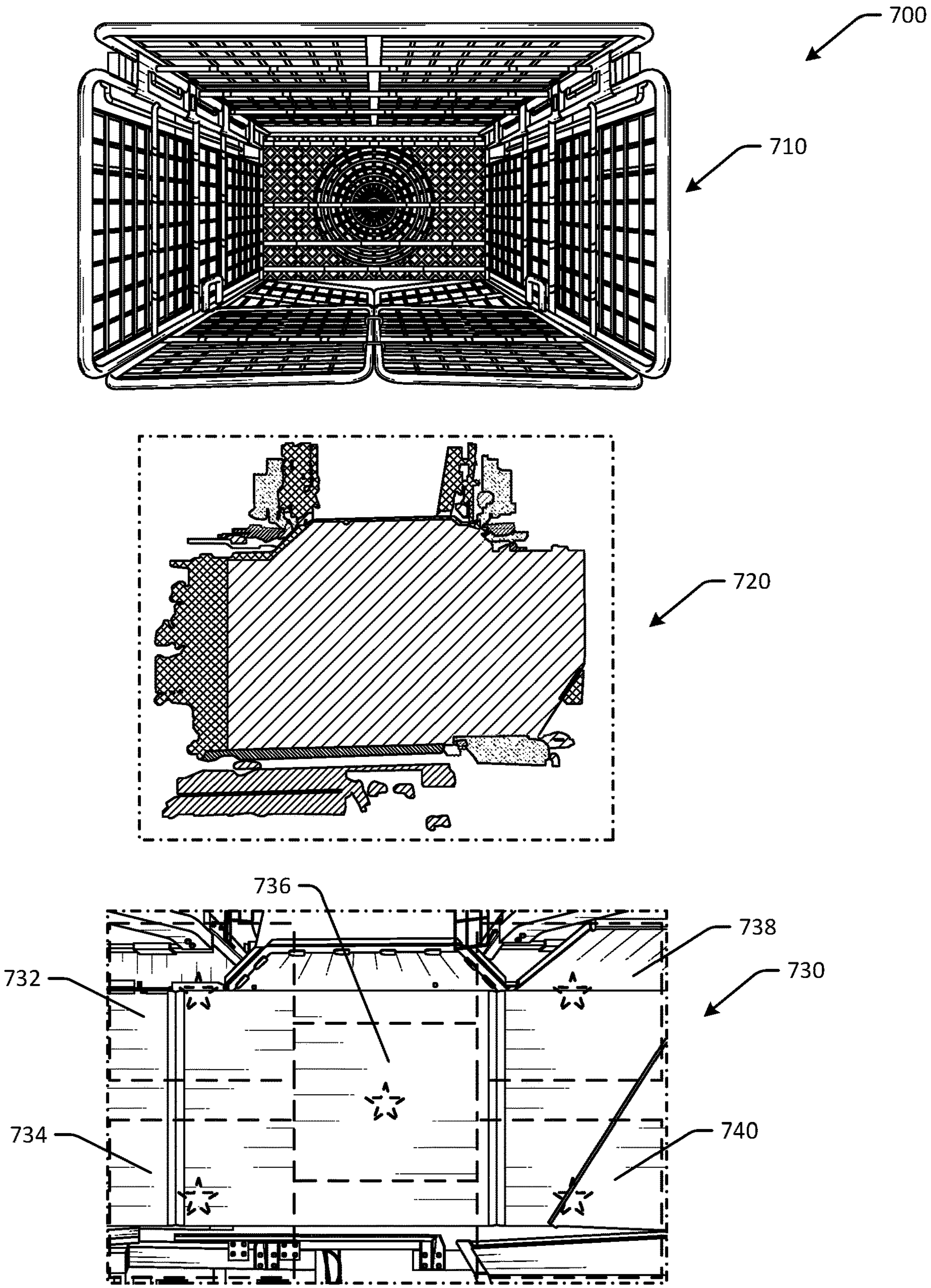
FIG. 7 is a schematic illustration of example images and related processing for continuous camera calibration and automated correction for robotic systems in accordance with one or more embodiments of the disclosure.

FIG. 7 is a schematic illustration of example images and related processing for continuous camera calibration and automated correction for robotic systems in accordance with one or more embodiments of the disclosure. Other embodiments may include additional or fewer components. The illustration of FIG. 7 is not to scale, and may not be illustrated to scale with respect to other figures. The components illustrated in FIG. 7 may be components of the robotic system discussed with respect to FIGS. 1-6.

In FIG. 7, a first image 710 depicts an example monochrome image from a two dimensional camera over place scene. Similar to a third image 730, which may be an red-green-blue (RGB) image, a five quadrant analysis can be performed for both sharpness check and valid image confirmation. A second image 720 depicts example depth data or point cloud data from an overhead three dimensional camera. The noise and the density of three dimensional data can be used to determine the quality of data. The third image 730 is example RGB data from an overhead two dimensional RGB camera. The pixel values over five quadrants (e.g., a scene image can be roughly divided into four equal quadrants 732, 734, 738, 740, and the image center can be considered as the fifth quadrant 736) can be used for validate the image quality for sharpness, color temperature, and quality of two dimensional data.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component.

Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
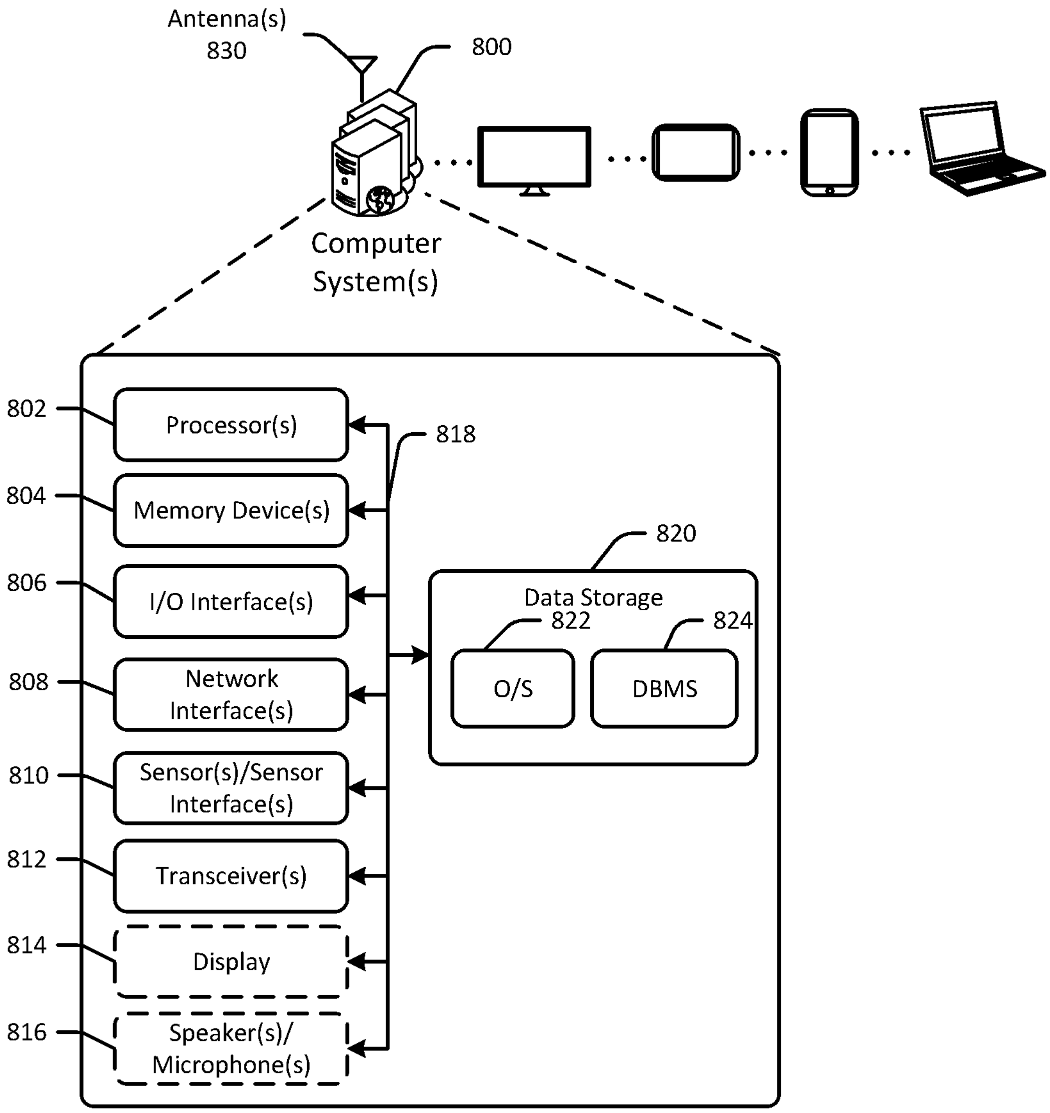
FIG. 8 schematically illustrates an example architecture of a computer system associated with a robotic system in accordance with one or more embodiments of the disclosure.

FIG. 8 is a schematic block diagram of one or more illustrative computer system(s) 800 in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for the device(s) of FIGS. 1-7. For example, the computer system(s) 800 may control one or more aspects of the continuous camera calibration and automated correction for robotic systems described in FIGS. 1-7, such as determining camera images, determining calibration adjustments, determining which piston subassemblies to extend or retract, where a robotic arm or other device is to position a picking assembly, and so forth.

The computer system(s) 800 may be configured to communicate with one or more servers, user devices, or the like. The computer system(s) 800 may be configured to identify items, retrieve items, move items, calibrate the robotic manipulator, and so forth.

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system(s) 800 may further include one or more antenna(s) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the O/S 822 may be loaded from the data storage 820 into the memory 804 and may provide an interface between other application software executing on the computer system(s) 800 and the hardware resources of the computer system(s) 800. More specifically, the O/S 822 may include a set of computer-executable instructions for managing the hardware resources of the computer system(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS 824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system (s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), Fire Wire, Thunderbolt, Ethernet port or other connection protocol that may connect to one or more networks. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(s) 830 may include any suitable type of antenna depending, for example, on the communications protocols used to transmit or receive signals via the antenna (s) 830. Non-limiting examples of suitable antennas may include directional antennas, non-directional antennas, dipole antennas, folded dipole antennas, patch antennas, multiple-input multiple-output (MIMO) antennas, or the like. The antenna(s) 830 may be communicatively coupled to one or more transceivers 812 or radio components to which or from which signals may be transmitted or received.

As previously described, the antenna(s) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 830 may be configured to transmit or receive radio frequency signals within any suitable frequency range forming part of the unlicensed portion of the radio spectrum.

The antenna(s) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 830—transmitting or receiving radio frequency (RF) signals in the bandwidth and/or channels corresponding to the communications protocols utilized by the computer system (s) 800 to communicate with other devices. The transceiver (s) 812 may include hardware, software, and/or firmware for modulating, transmitting, or receiving—potentially in cooperation with any of antenna(s) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computer system(s) 800. The transceiver (s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module (s) depicted in FIG. 8 may be implemented, at least partially, in hardware and/or firmware across any number of devices.

It should further be appreciated that the computer system (s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module (s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A robotic system comprising:

a robotic arm disposed in a closed environment;

a picking assembly coupled to the robotic arm, the picking assembly configured to grasp and release objects;

a first calibration plate rigidly mounted at a first location in the closed environment, the first calibration plate having a first pattern disposed thereon;

a second calibration plate rigidly mounted at a second location in the closed environment, the second calibration plate having a second pattern disposed thereon;

a first camera oriented towards the robotic arm at a downwards angle relative to horizontal, wherein at least the first calibration plate or the second calibration plate is within a field of view of the first camera;

a second camera oriented towards the robotic arm at an upwards angle relative to horizontal, wherein at least the first calibration plate or the second calibration plate is within a field of view of the second camera; and a controller configured to:

determine a first image of the first calibration pattern;

determine, using the first image, a first calibration metric;

determine that a difference between the first calibration metric and a default value is greater than or equal to a first threshold amount; cause a calibration process to be initiated;

cause the robotic manipulator to move to a first predetermined position;

determine first position data associated with a pose of the robotic manipulator at the first predetermined position;

determine, using the first camera, a second image of the first calibration pattern when the robotic manipulator is at the first predetermined position; and determine a first calibration adjustment based at least in part on the first position data and the second image.

2. The robotic system of claim 1, wherein the controller is further configured to:

determine a third image of the first calibration pattern;

determine, using the third image, a second calibration metric; and determine that a difference between the first calibration metric and a default value is less than the first threshold amount;

wherein the second image is captured after the calibration process is complete.

3. The robotic system of claim 1, wherein the first camera has a first resolution, and the second camera has a second resolution; and wherein the first pattern is configured for imaging at the first resolution, and the second pattern is configured for imaging at the second resolution.

4. The robotic system of claim 1, wherein the first image is captured while the robotic manipulator is in motion.

5. A robotic system comprising:

a robotic manipulator;

a picking assembly coupled to the robotic manipulator, the picking assembly configured to grasp and release items;

a first camera having a first field of view;

a first calibration pattern disposed at a first location within the first field of view; and a controller configured to automatically calibrate the robotic system, wherein the controller is configured to:

determine a first image of the first calibration pattern;

determine, using the first image, a first calibration metric;

determine that a difference between the first calibration metric and a default value is greater than or equal to a first threshold amount;

cause a calibration process to be initiated;

cause the robotic manipulator to move to a first predetermined position;

determine first position data associated with a pose of the robotic manipulator at the first predetermined position;

determine, using the first camera, a second image of the first calibration pattern when the robotic manipulator is at the first predetermined position; and determine a first calibration adjustment based at least in part on the first position data and the second image.

6. The robotic system of claim 5, wherein the controller is further configured to:

determine a third image of the first calibration pattern;

determine, using the third image, a second calibration metric; and determine that a difference between the first calibration metric and a default value is less than the first threshold amount;

wherein the second image is captured after the calibration process is complete.

7. The robotic system of claim 6, wherein the second calibration metric is a geometric validation metric or an optical validation metric.

8. The robotic system of claim 5, wherein the first calibration metric is a focus validation metric or a distortion validation metric.

9. The robotic system of claim 5, wherein the first calibration metric is a sharpness estimation metric or a white balance metric.

10. The robotic system of claim 5, wherein the first position data comprises position data and orientation data.

11. The robotic system of claim 5, wherein the first camera is oriented downwards, the robotic system further comprising:

a second camera oriented downwards;

a third camera oriented upwards; and a fourth camera oriented upwards;

wherein the controller is configured to calibrate the robotic system using images captured by the first camera, the second camera, the third camera, and the fourth camera.

12. The robotic system of claim 5, further comprising:

a second calibration pattern disposed at a second location within the first field of view; and a third calibration pattern disposed at a third location within the first field of view.

13. The robotic system of claim 5, further comprising:

a color correction pattern disposed adjacent to the first calibration pattern.

14. The robotic system of claim 13, wherein the controller is further configured to:

determine an image of the color correction pattern using the first camera; and adjust a color balance of the first camera based at least in part on the image.

15. A robotic picking system comprising:

a robotic arm;

a picking assembly coupled to the robotic arm;

a first camera having a first field of view;

a second camera having a second field of view;

a first calibration pattern disposed at a first location within the first field of view;

a second calibration pattern disposed at a second location within the second field of view; and a controller configured to automatically calibrate the robotic system using the first camera and the second camera, wherein the controller is configured to:

determine a first image of the first calibration pattern;

determine, using the first image, a first calibration metric;

determine that a difference between the first calibration metric and a default value is greater than or equal to a first threshold amount;

cause a calibration process to be initiated;

cause the robotic manipulator to move to a first predetermined position;

determine first position data associated with a pose of the robotic manipulator at the first predetermined position;

determine, using the first camera, a second image of the first calibration pattern when the robotic manipulator is at the first predetermined position; and determine a first calibration adjustment based at least in part on the first position data and the second image.

16. The robotic picking system of claim 15, wherein the controller is further configured to:

determine a third image of the first calibration pattern;

determine, using the third image, a second calibration metric; and determine that a difference between the first calibration metric and a default value is less than the first threshold amount;

wherein the second image is captured after the calibration process is complete.

17. The robotic picking system of claim 15, wherein the first image is captured while the robotic manipulator is in motion.

* * * * *